US010410566B1

(12) United States Patent
Kerdemelidis

(10) Patent No.: US 10,410,566 B1
(45) Date of Patent: Sep. 10, 2019

(54) HEAD MOUNTED VIRTUAL REALITY DISPLAY SYSTEM AND METHOD

(71) Applicant: Andrew Kerdemelidis, London (GB)

(72) Inventor: Andrew Kerdemelidis, London (GB)

( * ) Notice: Subject to any disclaimer, the term of this patent is extended or adjusted under 35 U.S.C. 154(b) by 0 days.

(21) Appl. No.: 15/426,035

(22) Filed: Feb. 6, 2017

(51) Int. Cl.
*G02B 27/01* (2006.01)
*G09G 3/20* (2006.01)
*G06F 3/01* (2006.01)
*G02B 27/00* (2006.01)

(52) U.S. Cl.
CPC ....... *G09G 3/2003* (2013.01); *G02B 27/0031* (2013.01); *G02B 27/0081* (2013.01); *G06F 3/011* (2013.01); *G09G 2300/0452* (2013.01); *G09G 2300/0465* (2013.01); *G09G 2320/028* (2013.01); *G09G 2320/0233* (2013.01); *G09G 2320/0242* (2013.01); *G09G 2320/0266* (2013.01); *G09G 2340/0407* (2013.01)

(58) Field of Classification Search
CPC ......... G09G 3/2003; G09G 2300/0452; G09G 2300/0465; G09G 2320/0233; G09G 2320/0242; G09G 2320/0266; G09G 2320/028; G09G 2340/0407; G02B 27/0031; G02B 27/0081; G06F 3/011
See application file for complete search history.

(56) References Cited

U.S. PATENT DOCUMENTS

| | | | | | |
|---|---|---|---|---|---|
| 6,043,800 | A | * | 3/2000 | Spitzer | A61B 3/113 257/E21.614 |
| 6,072,445 | A | * | 6/2000 | Spitzer | A61B 3/113 257/E21.614 |
| 6,580,405 | B1 | * | 6/2003 | Yamazaki | G02B 27/017 345/103 |
| 7,442,973 | B2 | * | 10/2008 | Komoguchi | H01L 27/14601 257/291 |
| 2010/0225792 | A1 | * | 9/2010 | Kumagai | H01L 27/14627 348/273 |
| 2011/0242376 | A1 | * | 10/2011 | Ando | H01L 27/14623 348/294 |
| 2012/0212484 | A1 | * | 8/2012 | Haddick | G02B 27/0093 345/419 |

(Continued)

*Primary Examiner* — Christopher E Leiby

(57) ABSTRACT

A head mounted virtual reality display system and method is provided. The invention includes a head mounted apparatus worn by a user and a display element having an array of display regions wherein said display region contains a smaller active region having an output aperture with at least one pixel of variable color and luminosity and larger non-active region adjacent to the active region. The invention further includes means for scanning the apparent position of the active region onto the user's eye in both horizontal and/or vertical directions between a plurality of sub-frames within the display region in a pre-determined fill pattern, wherein said sub-frames cover an area including the original position of the larger non-active region and active region on the display region. In addition, a processor is provided which is configured to synchronize activation and adapt the color and luminosity of said at least one pixel in each said active region when the apparent position of the active region is scanned between sub-frames in order to correspond with the desired resolution of a multimedia image to be viewed by the user's eye.

6 Claims, 13 Drawing Sheets

(56) References Cited

U.S. PATENT DOCUMENTS

| | | | |
|---|---|---|---|
| 2012/0212499 A1* | 8/2012 | Haddick | G02B 27/0093 |
| | | | 345/589 |
| 2012/0218301 A1* | 8/2012 | Miller | G02B 27/017 |
| | | | 345/633 |
| 2013/0278631 A1* | 10/2013 | Border | G02B 27/017 |
| | | | 345/633 |
| 2015/0243094 A1* | 8/2015 | Schowengerdt | G06T 13/40 |
| | | | 345/633 |
| 2016/0246055 A1* | 8/2016 | Border | G02B 27/017 |
| 2016/0274361 A1* | 9/2016 | Border | G02B 27/0176 |
| 2016/0320620 A1* | 11/2016 | Maimone | G06F 3/011 |

* cited by examiner

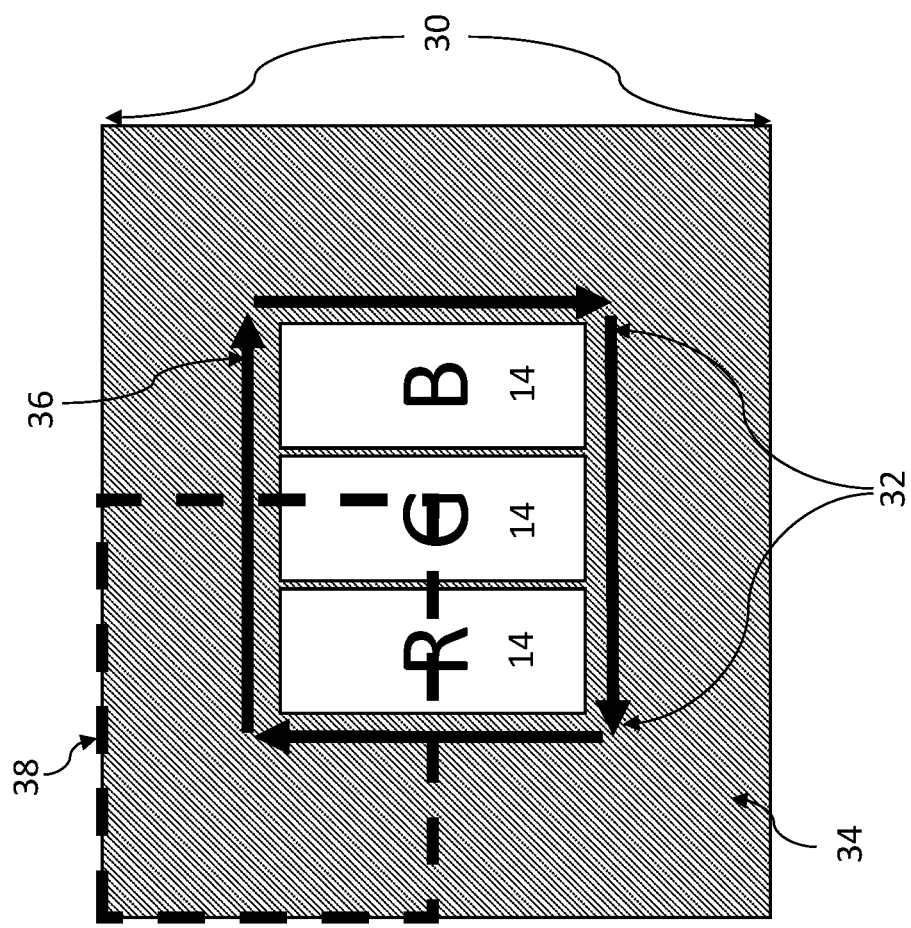

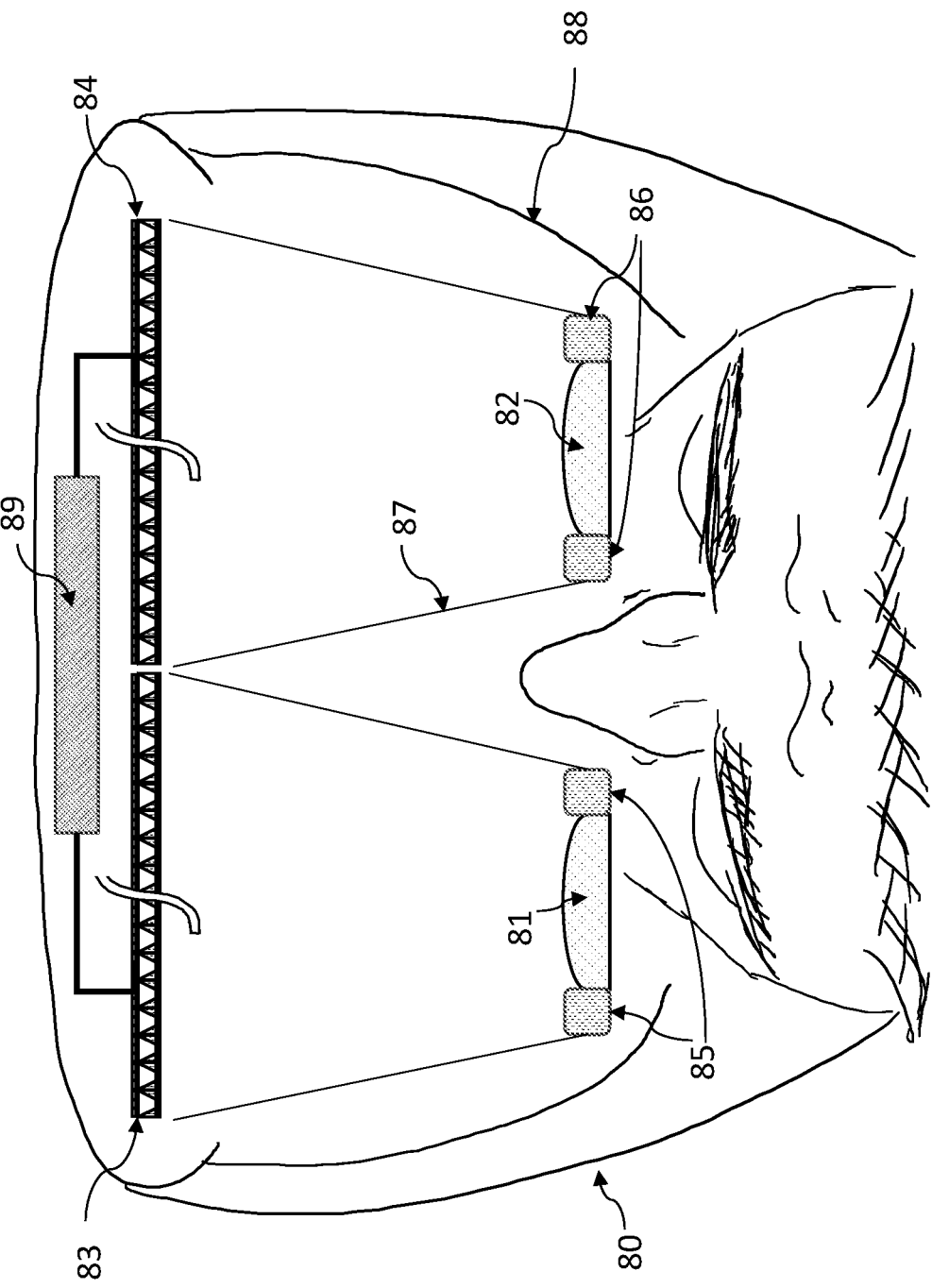

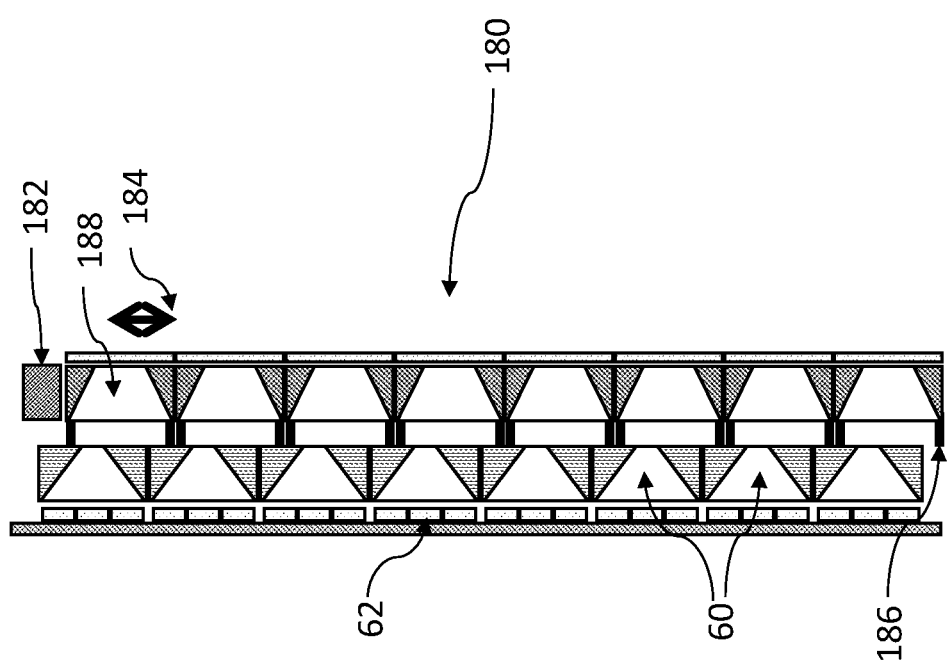

HEAD MOUNTED VIRTUAL REALITY DISPLAY SYSTEM AND METHOD

FIELD OF THE INVENTION

The present invention relates generally to a head mounted virtual reality display system and method.

Particularly, but not exclusively, the invention relates to a head mounted virtual reality display system and method including a head mounted apparatus worn by a user and a display element having an array of display regions wherein said display region contains a smaller active region having an output aperture with at least one pixel of variable colour and luminosity and larger non-active region adjacent to the active region. The invention further includes means for scanning the apparent position of the active region onto the user's eye in both horizontal and/or vertical directions between a plurality of sub-frames within the display region in a pre-determined fill pattern, wherein said sub-frames cover an area including the original position of the larger non-active region and active region on the display region. In addition, a processor is provided which is configured to synchronise activation and adapt the colour and luminosity of said at least one pixel in each said active region when the apparent position of the active region is scanned between sub-frames in order to correspond with the desired resolution of a multimedia image to be viewed by the user's eye.

BACKGROUND OF THE INVENTION

Virtual reality displays provide for an immersive experience, which can generate a feeling that a user is in a completely different environment from reality. A disadvantage to these displays is that the imaging element is usually an LCD or OLED display, with optics in front that magnify the display so that it fills up as much of the visual field of the user as possible. Such displays are typically RGB displays. With reference to FIG. 1, each pixel 10 on an RGB display comprises an active region 12 with adjacent triad of red, green and blue sub-pixels 14. This active region may also be referred to as an output aperture. It is possible to modify the apparent colour of the pixel by adjusting the level of brightness or amount of light transmitted by each sub-pixel in the triad. With reference to FIG. 2, each pixel in an RGB display is arranged in an array of adjacent RGB sub-pixels. When viewed at a distance, a user cannot discern the individual sub-pixels and perceives each pixel 10 as generating a uniform colour. However, in virtual reality displays, the screens are placed very close to a user's eyes, which means that display artefacts of the display become highly magnified. In particular, virtual reality displays that are currently state-of-the art have discernible 'screen-door' and spatial colour profile artefacts due to various manufacturing process requirements, these include conductive traces leading to TFT or OLED pixel elements on the display to drive each pixel, thin film transistors, and since light does not pass through these structures or is masked to be opaque, the pattern 16 used by the manufacturer to establish a pattern on the display can be clearly seen by a user wearing a head-mounted display, distracting from the immersive experience.

Each pixel 10 is also placed in a set pattern, for example, a Bayer pattern arrangement which cannot have a uniform colour luminance profile as it is comprised of separate red, green and blue sub-pixels that are imaged on the viewers eye. Due to manufacturing constraints, the active region of the sub-pixels 20 are also always smaller than the pixel cluster arrays 22, 24, and therefore contribute to these artefacts and distract from the immersive experience. Alongside the reduction of these artefacts, it is also important to have as high a resolution to be perceived by an observer as possible, this also being a key driver to enable an immersive experience.

Accordingly, it is an object of the present invention to provide a means for overcoming the above-mentioned problems, or at least providing the public with a useful choice. Further objects and advantages of the present invention will be disclosed and become apparent from the following description.

SUMMARY OF THE INVENTION

The present invention relates generally to a head mounted virtual reality display system and method.

In a first aspect the invention provides a head mounted virtual reality display system comprising:

a head mounted apparatus worn by a user;

a display element having an array of display regions wherein said display region contains a smaller active region having an output aperture with at least one pixel of variable colour and luminosity and larger non-active region adjacent to the active region;

means for scanning the apparent position of the active region onto the user's eye in both horizontal and/or vertical directions between a plurality of sub-frames within the display region in a pre-determined fill pattern, wherein said sub-frames cover an area including the original position of the larger non-active region and active region on the display region;

a processor configured to synchronise activation and adapt the colour and luminosity of said at least one pixel in each said active region when the apparent position of the active region is scanned between sub-frames in order to correspond with the desired resolution of a multimedia image to be viewed by the user's eye.

In a second aspect, the invention provides head mounted virtual reality display method, the method comprising the steps of:

providing a head mounted apparatus worn by a user;

providing a display element having an array of display regions wherein said display region contains a smaller active region having an output aperture with at least one pixel of variable colour and luminosity and larger non-active region adjacent to the active region;

providing means for scanning the apparent position of the active region onto the user's eye in both horizontal and/or vertical directions between a plurality of sub-frames within the display region in a pre-determined fill pattern, wherein said sub-frames cover an area including the original position of the larger non-active region and active region on the display region;

providing a processor configured to synchronise activation and adapt the colour and luminosity of said at least one pixel in each said active region when the apparent position of the active region is scanned between sub-frames in order to correspond with the desired resolution of a multimedia image to be viewed by the user's eye.

Preferably, the head mounted virtual reality display system and method further comprises an optical element disposed between said display element and the eye of said user wherein means for scanning is configured to actuate the optical element to offset the apparent position of the active region.

Preferably, the head mounted virtual reality display system and method further comprises a waveguide adjacent to said display region between said display region and the eye of a user, wherein said waveguide is configured to decrease the apparent size of said active region and increase the uniformity of chrominance.

Preferably, the pre-determined fill pattern comprises at least one of the following group: raster, square, rectangular, circular, linear, spiral, ellipsoid, lyssajous, and/or random fill.

Preferably, the optical element is comprised of a combination of at least one or more of the group consisting of: single plano/convex lens; aspheric optic; rotating wedge; Fresnel lens; combination Fresnel/Aspheric lens; compound optical assembly; diffraction grating; zone plate or zone plate array; acousto-optical optic such as, but not limited to, KTLN (Potassium Lithium Tantalate Niobate) or TeO Tellurium Oxide with electronic or piezo-electric actuation; non-linear optic, prism, rectangular wedge or other plano/plano optic or displacement mirror.

Preferably, the ratio of the area of the smaller active region to the larger non-active region is at least 1:4.

Preferably, the scanning means ensures that the apparent position of said active region is scanned through each sub-frame in said plurality of sub-frames at a rate of at least 90 Hz.

More specific features for preferred embodiments are set out in the description below.

BRIEF DESCRIPTION OF THE DRAWINGS

The invention will now be described by way of example only with reference to the accompanying drawings, in which:

FIG. 3 illustrates a pixel display region arrangement according to an embodiment of the invention.

FIG. 8 illustrates a head mounted display according to a preferred embodiment of the invention.

FIG. 18 illustrates an optical arrangement with a second motile waveguide array in front of the display element according to an alternative embodiment of the invention.

DETAILED DESCRIPTION OF THE INVENTION

Various embodiments of the present invention are described hereinafter with reference to the figures. It should be noted that the figures are only intended to facilitate the description of specific embodiments of the invention. In addition, an aspect described in conjunction with a particular embodiment of the present invention is not necessarily limited to that embodiment and can be practiced in any other embodiments of the present invention.

The present invention relates generally to a head mounted virtual reality display system and method.

Particularly, but not exclusively, the invention relates to a head mounted virtual reality display system and method including a head mounted apparatus worn by a user and a display element having an array of pixels configured to display a multimedia image which has been separated into plurality of sub-frames wherein said pixels have a smaller display region and larger non-active region adjacent to the display region comprising a plurality of sub-frames. Means are provided for offsetting the apparent position of the pixel imaged onto the user's eye in both horizontal and/or vertical directions such that to scanned between said plurality of sub frames within the larger non-active region on the display element in a pre-determined sequence. The system further includes a processor configured to adapt the colour of said pixels when the apparent position is scanned between sub frames in order to correspond with the desired resolution of said multimedia image to be imaged onto the user's eye.

As noted above, prior art displays have artefacts which distract from a user's immersive experience. The invention provides a mechanism to reduce or eliminate such artefacts and also increase the resolution of a head mounted virtual reality display as perceived by a user.

In particular, the invention described herein describes a method to reduce negative visual artefacts such as screen door, moiré, uneven colour profile or other artefacts introduced by the pixel pattern of an imaging display. The method also makes it possible to increase the spatial resolution of a display by a factor that is greater multiple than the number of physical pixels on the display element employed in the device.

Figure 1:
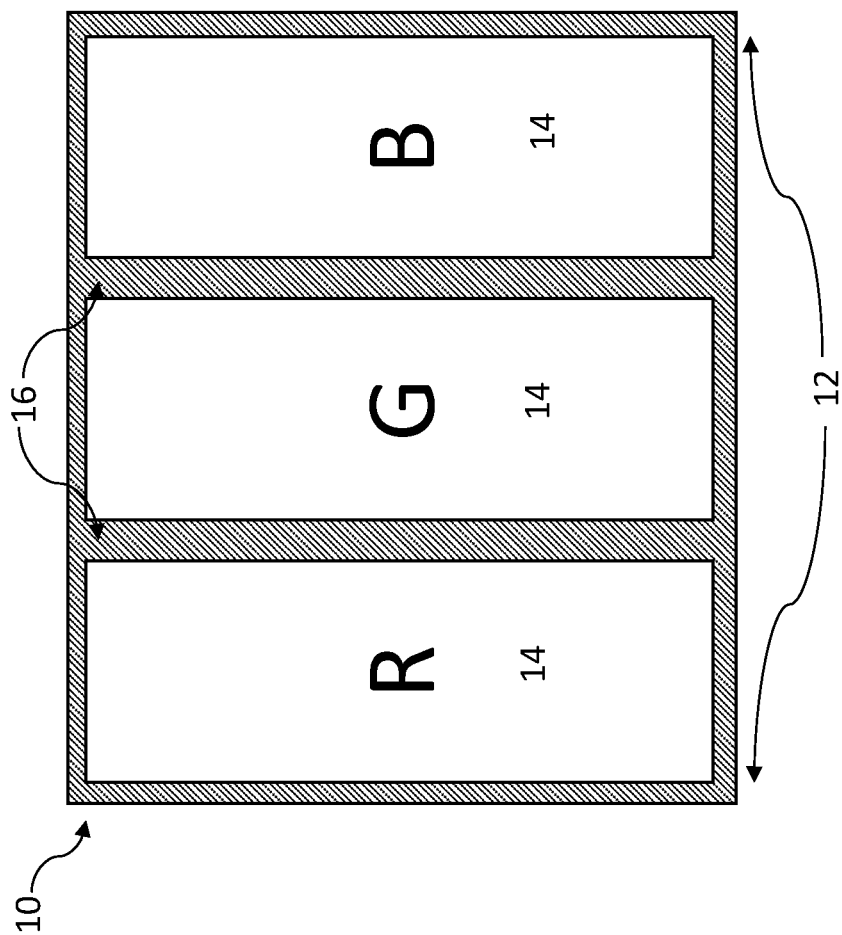
FIG. 1 illustrates an example individual pixel arrangement according to the prior art.
Figure 2:
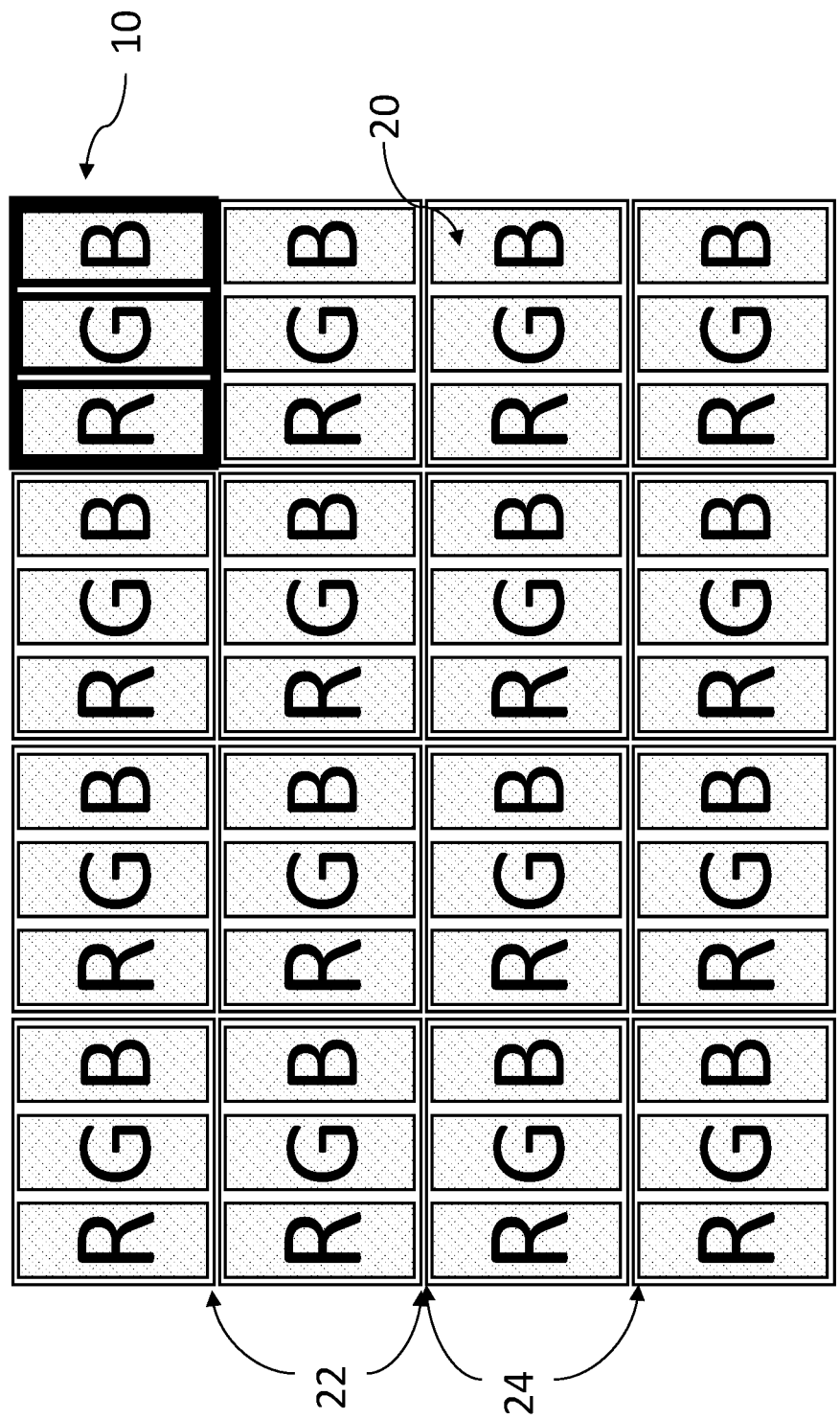
FIG. 2 illustrates an example display arrangement comprising individual pixels according to the prior art.

In contrast to the standard displays shown in FIGS. 1 and 2, the red-green-blue cluster of sub-pixels is arranged such that the active pixel region for each fills as much of the display region of the pixel as possible, in a ratio as close to 1:1 as possible. In the invention described it is necessary to allow for an area scan of an individual pixel active region to stay within the bounds of the pixel display region.

With reference to FIG. 3, preferably, this effect is realised by the invention employing a pixel display region 30, comprising an active region 32 with output aperture for each pixel including light emitting (for example, LED or OLED) or light controlling (for example, spatial light modulators such as LCD or MEMS micromirror array) pixels or sub-pixel clusters 14 on the active region 32 that is surrounded by a non-active region 34 that increases the active region to non-active region ratio such that a fill pattern can be traced in a path 36 by offsetting or scanning the active region 32 in a controlled manner at high speed, for example, by generating a repetitive movement of the display itself (see FIG. 17 below) or through the periodic movement of an optical element or elements (see FIGS. 8 and 9 below) between the display and an observers eye, with the effect that pixels on the display are repetitively offset by a small amount and therefore resolve at an offset position on the retina. As each offset position corresponds to a sub-frame positioning 38 of the active region 32 of a pixel, this allows for increasing the apparent resolution of a display above the actual physical pixel count of that display. Correspondingly, the display is driven such that when each pixel is at an offset sub-frame position 38, the underlying pixel on the physical display is driven corresponding to that sub-frame representation of a higher-resolution source image which is intended to be imaged to the viewer (see discussion of FIG. 10 below).

The gaps and non-active regions between pixels due to thin film transistor (TFT), structural layers and masks such as those on LCD and OLED displays giving rise to a 'screen door' effect are mitigated using this method, since the continuous movement of the active region is controlled to 'brush over' the non-active dark physical pixel regions, thereby realising a continuous and uniform luminance fill over an integral time period. The persistence of vision of the observer (due to retinal light integration) means that an observer watching a display would see a uniform fill across the frame composed of sub-frames within it, and this will enhance the immersive experience had by the user both from the standpoint of the higher perceived resolution with far fewer luminance uniformity artefacts. To clarify, while (in operation) the apparent position of the active region 32 is scanned over the sub-frame 38 positions and overlaps the non-active region 34 in a pre-determined fill pattern (see FIGS. 11-15 below), the boundaries of the apparent position of the non-active region 34 and sub-frame 38 will also be offset. However, the active region 32 is scanned over the co-ordinates of the sub-frame 38 positions as if the offsetting of the non-active-region 34 and sub-frame 38 positions had not occurred.

Figure 4:
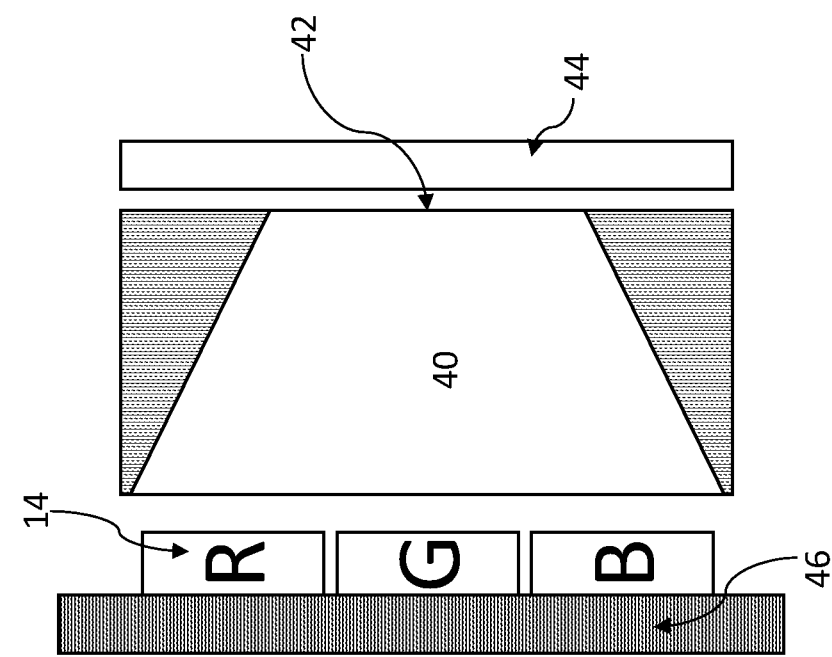
FIG. 4 illustrates a waveguide arrangement according to an embodiment of the invention.

FIG. 4 illustrates a waveguide arrangement according to an embodiment of the invention. In this embodiment, a tapered waveguide 40 is positioned on top of each pixel cluster that effects a reduced pixel window size (output aperture for each pixel) at the waveguide output 42, and, optionally, a diffuser layer 44 is placed on top of the output of the waveguide such that the spatial chrominance profile across each pixel is made uniform across the aperture (light output from each physical pixel colour is diffused together to create a uniform chrominance profile) when the underlying red/green/blue physical sub-pixels 14 are active. Conductive traces 46 driving the sub-pixels 14 may increase the size of the non-active region. Those skilled in the art will recognize that it is possible to replace or omit the diffuser in exchange for a waveguide that also is formed to produce a diffusion effect, or to place the diffuser either under the waveguide (where it is proximal to the pixels) or directly above the output windows of the waveguide array, to the same effect.

Figure 5:
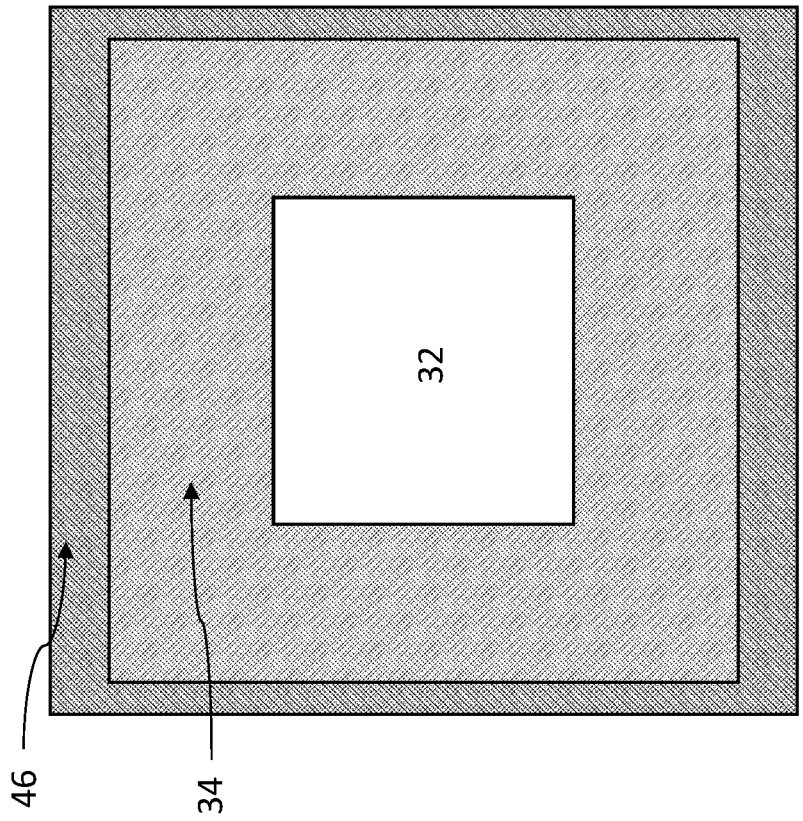
FIG. 5 illustrates a pixel display region with waveguide according to an embodiment of the invention shown in FIG. 4.

FIG. 5 illustrates a pixel display region with waveguide according to an embodiment of the invention shown in FIG. 4. As shown, the active region 32 is smaller than the non-active region 34, which is further increased by the region covered by the conductive traces 46 driving the pixels. Individual sub-pixels (not shown) are obscured by the diffuser layer (not shown) allowing a uniform chrominance profile. The benefits of using a waveguide 40 to reduce the size of the individual active regions 32 or sub-pixel 14 cluster output, rather than using smaller pixels with an non-active area around them is that when manufacturing displays, it is very difficult to ensure homogeneous luminance of each pixel, requiring more complex display calibrations at the point of manufacture for ever decreasing pixel sizes. This applies for both dominant display technologies at present—LCD and OLED. Also, non-active regions of each pixel are proportionally larger, that is the ratio between non-active to active pixel regions decreases with decreasing pixel size, so screen-door effects may become worse at smaller pixel sizes. The method herein also reduces the pixel active region size while still allowing relatively larger pixel sizes that allow for a lesser amount of pixel luminance calibration at the point of manufacture.

Figure 6:
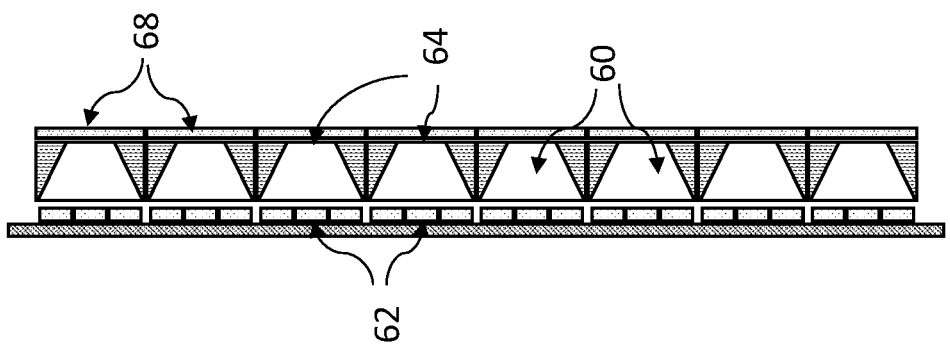
FIG. 6 illustrates a waveguide array according to an embodiment of the invention.

The inventions can combine the individual waveguides of FIG. 4 to produce a waveguide array according to an embodiment of the invention as shown in FIG. 6.

In a preferred embodiment a waveguide array 60 would be positioned in front of each red-green-blue pixel cluster 62 and would reduce the output apertures 64 of the pixel cluster and corresponding non-active regions to a ratio that is less than 1:1. In a preferred embodiment, this ratio would be 1:4. As mentioned above, a preferred embodiment the waveguide would include optical diffusers 68 at the outputs 64 such that the light output from the red, green and blue pixel clusters is mixed so as to provide for an even spatial colour profile. Alternatively, the waveguide itself can act as an optical diffuser to ensure uniform chrominance. The technology employed in the sub-pixel array includes but is not limited to an LCD, OLED, AMOLED, RGB laser-pixeled or micro-mirror array (MEMS) display.

Figure 7:
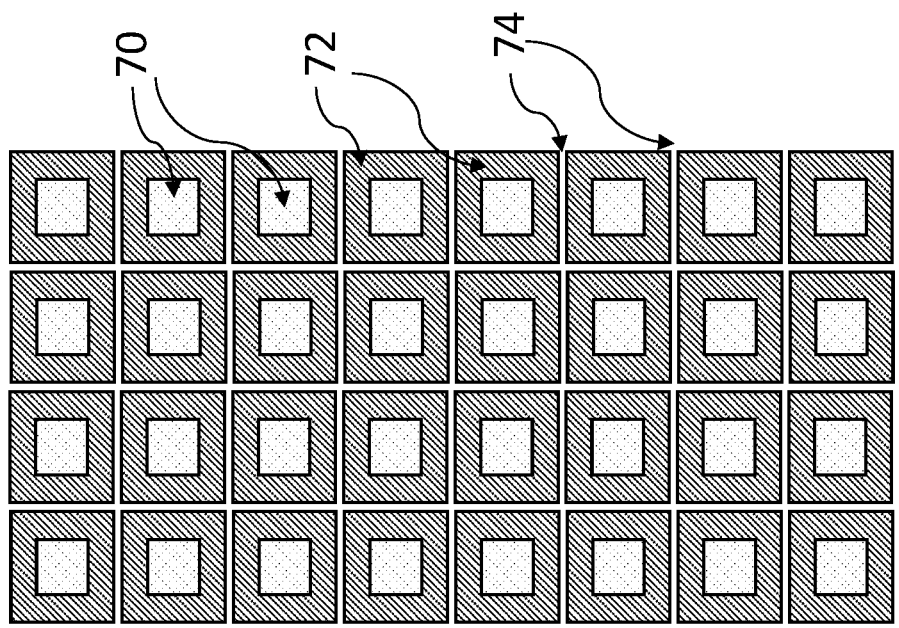
FIG. 7 illustrates an array of pixel display regions according to an embodiment of the invention.

FIG. 7 illustrates an array of pixel display regions according to an embodiment of the invention, whereby the array of waveguides have reduced the size of the active regions 70 of the sub-pixels 14, which are surrounded by larger non-active regions 72 at an approximate ratio of 1:4, and the diffusers 50 have ensured uniform chrominance of the active regions 70. In operation, the apparent position of the active regions 70 are periodically moved to completely cover the full underlying non-active regions 72 (also including the regions which are non-active due to physical limitations such as conductive traces 74.

In a preferred embodiment, an optical element is placed between the screen and the users' eye, such that when this optical element is controlled, it would offset the resultant image of the pixels projected onto the observers' retina by a small distance. Preferably this distance would be up to an amount that offsets the pixel in horizontal and vertical directions by the width of the dark/non-active area regions 72 surrounding a composite pixels in the active regions 70, but could also be several pixel widths in the vertical and horizontal directions tangential to the observers gaze.

FIG. 8 illustrates a head mounted display according to a preferred embodiment of the invention. In the preferred embodiment, the display apparatus is contained within a unit designed to be worn on the head of a viewer as a head mounted virtual reality display 80. Two separate optical elements such as lenses (81, 82) and display elements (83, 84), or a single display that is split logically to display one image for each eye, image the display onto the viewers retina. Actuators for each eye (85, 86) are employed to move the optical elements (81, 82) that are placed between the physical display elements (83, 84) (preferably consisting of red, green and blue pixels with waveguides 60 and diffusers 68 in a regular pattern as shown in FIGS. 6 and 7). The optical elements (81, 82) for each eye allow the observer wearing the headset to focus comfortably onto the screen, the ability for a user to adjust for the distance between the pupils of the eyes. Masking 87 ensures that images from a screen intended to be viewed by one eye do not get seen by the other eye. A head mount 88 affixes the display to the viewers' head, and is constructed to block out any external stray light. These displays typically include electronics and telemetry modules 89 to determine and measure the relative position and rotation of the headset accurately and rapidly.

In a preferred embodiment, each optical element (81, 82) is a plano/convex aspheric lens, and the actuators (85, 86) comprise an electro-mechanical device such as a solenoid or magnetic actuator housing the optical element and allowing it to move in a transverse (parallel) direction to the display in both vertical and horizontal directions (see discussion of FIG. 16 below). However, those skilled in the art will recognise that any form of mechanical actuator that can move an optical element through a specific periodic path can be employed to effect the apparent pixel offset.

Figure 9:
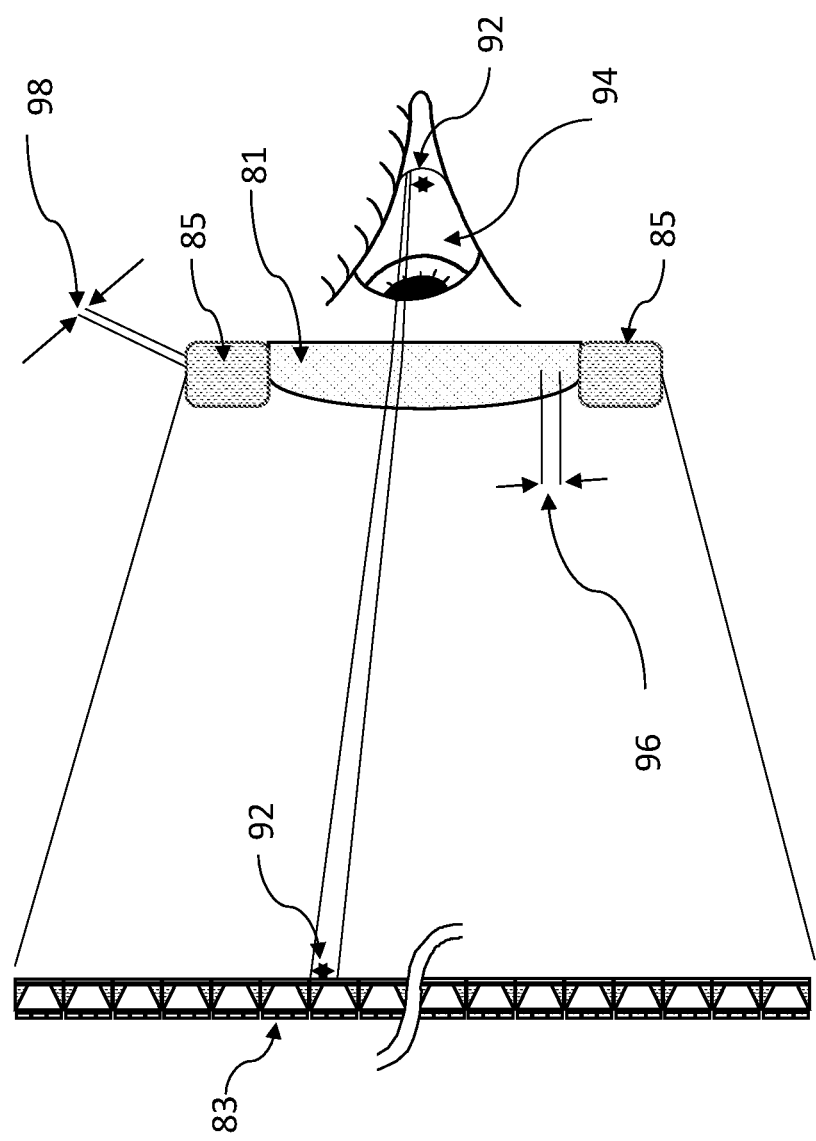
FIG. 9 illustrates a pixel offset generated by an actuator of an optical element according to an embodiment of the invention.

FIG. 9 illustrates a pixel offset generated by an actuator of an optical element according to an embodiment of the invention. In this embodiment the offset generated by this mechanical actuator would be such that the displacement of the optical element 81 results in a displacement of the image 90 which is then imaged onto the observers' retina. Those skilled in the art will recognise that the purpose of this optical assembly is to allow a pixel that is imaged onto an observers' retina to be offset by a specified amount in horizontal 96 and/or vertical 98 directions. In a preferred embodiment, this distance in both vertical and horizontal directions is between 0.1-10 pixel widths, but this offset may also be an arbitrary number of sub-pixel or pixel widths in horizontal and vertical directions to the imaging device plane depending on the amount of spatial resolution increase required. Preferably, the actuator 85 would move the optical element 81 to describe a periodic motion, preferably at a frequency at a minimum of 360 Hz, this example being for a display 83 employing four sub-frames and an overall frame-rate of 90 Hz. However, those skilled in the art will recognise that a frequency of between 20 Hz and 1 MHz could be used, depending on the actuation method employed, and that the path of the motion could follow lyssajous, square, raster or any other fill path patterns. The optical element 81 may be comprised of a combination of one or more of the following elements; single plano/convex lens, aspheric optic, rotating wedge, Fresnel lens, Combination Fresnel/Aspheric lens, compound optical assembly, diffraction grating, zone plate or zone plate array, acousto-optical optic such as, but not limited to, KTLN (Potassium Lithium Tantalate Niobate) or TeO Tellurium Oxide with electronic or piezo-electric actuation, non-linear optic, prism, rectangular wedge or other plano/plano optic or displacement mirror, one or more of these optics being repetitively moved or otherwise actuated or adjusted such that there is a perceived shift 92 in the position of the pixels displayed on a physical display 83 to a sub-frame position relative to an observers' eye 94 viewing the display through said optical assembly.

Preferably, for pixel patterns where the distance between pixels is the same vertically as it is horizontally to the image plane, and where discontinuous or non-active areas of the pixel are smaller than the active area of the pixel, the optical displacement follows a square path, and is controlled by servo-feedback to maintain that path, since a square path in this case would optimally move the active pixel aperture to fill a pixel area (see discussion of FIGS. 11-15 below). For simpler mechanical systems that do not employ servo-feedback to precisely control the offset of the optical element, those skilled in the art can see it could also be a circular motion corresponding to the first order natural or resonant frequency of the lens and mount assembly, or for the movable lens mount to be critically damped such that the actuator could drive the motion of the lens to follow an approximately square path. In this way, the effect is to move the physical display pixels through a continuum of offset positions that correspond to subframes of the image that is projected onto the viewers' retina.

Figure 10:
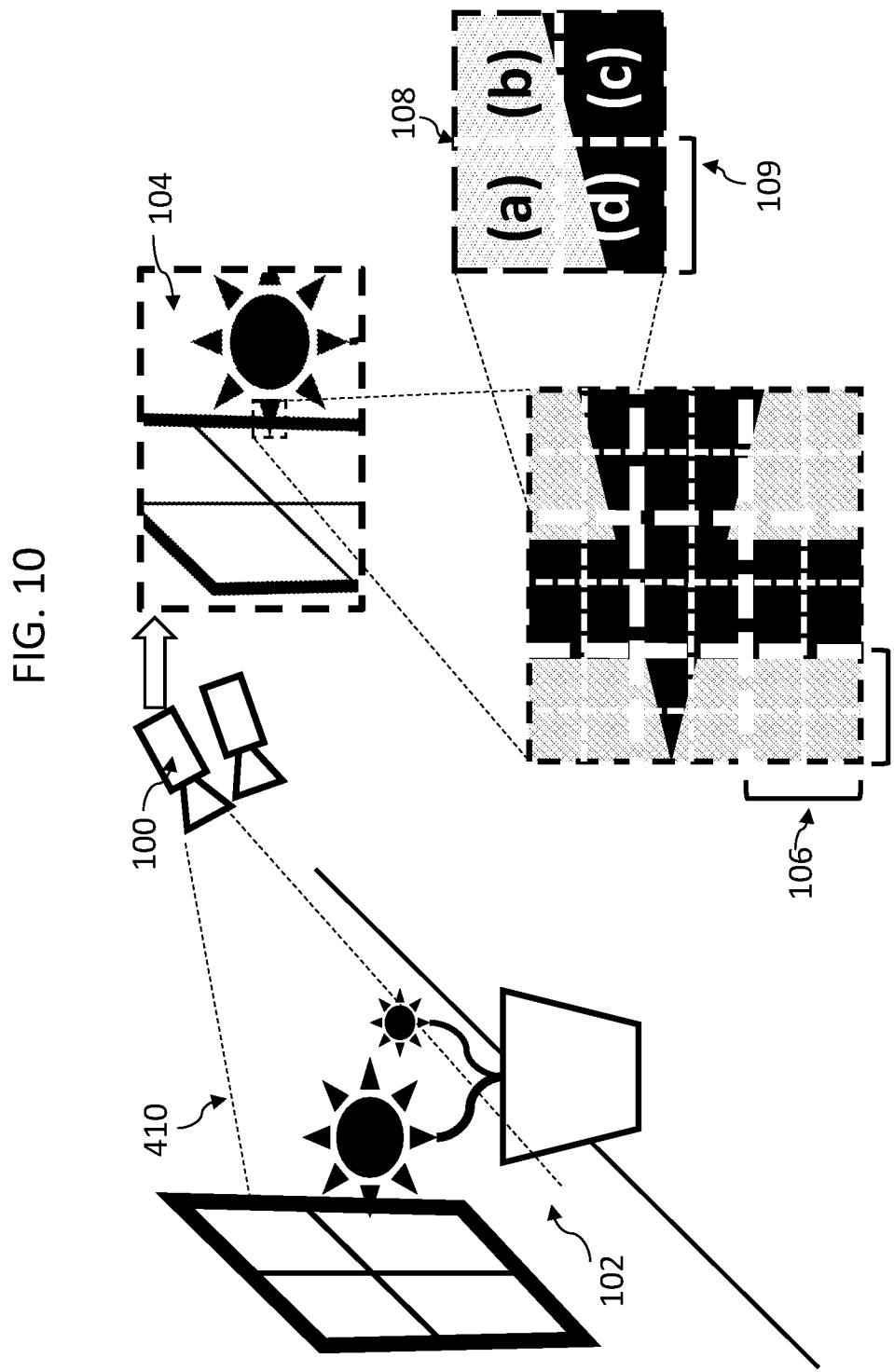
FIG. 10 illustrates a virtual image sampling and sub-frame representation according to an embodiment of the invention.

In operation, the electronics and telemetry modules 89 on the head mounted virtual reality display ensure that a virtual scene is rendered on the display. FIG. 10 illustrates a virtual image sampling and sub-frame representation according to an embodiment of the invention. These measurements taken by the modules 89 are used to position two virtual cameras 100 in a scene 102 that is being rendered for display, one corresponding to each eye and render the virtual scene into an image 104 for each display (only an image from a single camera is shown). The displays are driven with the captured virtual camera image corresponding to each eye, leading to an immersive stereoscopic effect for the observer to experience. The captured virtual camera image is usually sampled (or subsampled) by an image processor to a resolution 106 that corresponds to the physical pixel count of a display before being sent to the display to be viewed by the observer. In accordance with the preferred embodiment, as each offset position corresponds to a sub-frame positioning of a pixel 108, this allows for increasing the apparent resolution of a display above the actual physical pixel count of that display. Correspondingly, the display is driven such that when each pixel is at an offset sub-frame position 109, the underlying pixel on the physical display is driven corresponding to that sub-frame representation (108 (*a*),(*b*), (*c*),(*d*)) of a higher-resolution source image 104 which is intended to be imaged to the viewer.

Figure 11:
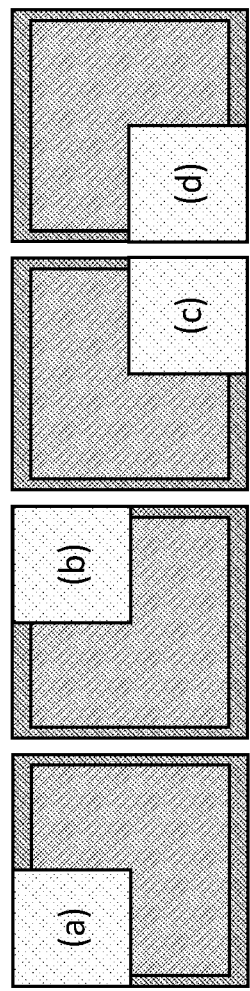
FIG. 11 illustrates a pixel offset scanning pattern according to an embodiment of the invention.
Figure 15:
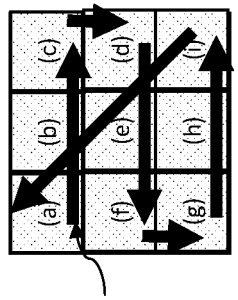
FIG. 15 illustrates a pixel offset scanning pattern for the display region of FIG. 14 according to an embodiment of the invention.
Figure 14:
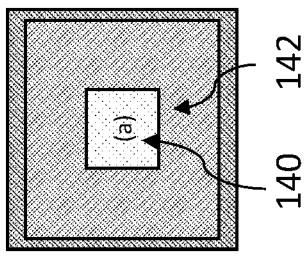
FIG. 14 illustrates a higher resolution display region according to an embodiment of the invention.
Figure 13:
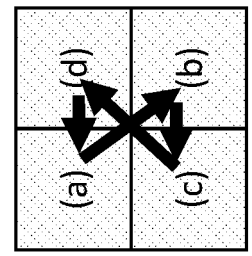
FIG. 13 illustrates an alternative pixel offset scanning pattern according to an embodiment of the invention.
Figure 12:
FIG. 12 illustrates an alternative pixel offset scanning pattern of FIG. 11. according to an embodiment of the invention.

Therefore, as noted above, the invention includes means (preferably, an optical element) for allowing a pixel that is imaged onto an observers' retina to be offset by a specified amount in horizontal and/or vertical directions In a preferred embodiment, the offset path described by the optical element is a square or rectangular pattern (a)-(d) as shown in in FIGS. 11 and 12, but the path described by the optical offset element may comprise other patterns such as diagonal pattern (a)-(d) as shown in FIG. 13. In another embodiment, if an active pixel aperture is employed with a 1:9 ratio between active 140 and non-active 142 regions as shown in FIG. 14, then, by employing a raster-like scan as shown in FIG. 15, nine spatial sub-frame positions (a)-(i) for the active pixel aperture can be effectively generated, which increases the spatial resolution three-fold in each of the X and Y directions, yielding an increase of nine-fold for the effective resolution of the display.

Other patterns will be apparent to those skilled in the art, including raster, square, rectangular, circular, linear, spiral, ellipsoid, lyssajous, random fill or any combination of these or other shaped paths, and an image can be generated on an observers' retina that an observer will perceive to have a more continuous and uniform spatial light distribution, without adversely affecting or, in specific cases described in this invention, being able to increase, the spatial resolution of the display.

As discussed above, the method to generate this offset thus includes, but is not limited to; a piezo-electric actuator, motor with spinning counterweight attached or coupled to the optical element to vibrate it in a transverse direction to the screen, pneumatic actuator, nitinol wire actuator, electrostatic actuator, moving coil actuator, moving mirror, acousto-optical or electro-optical deflector, solenoid actuator.

Figure 16:
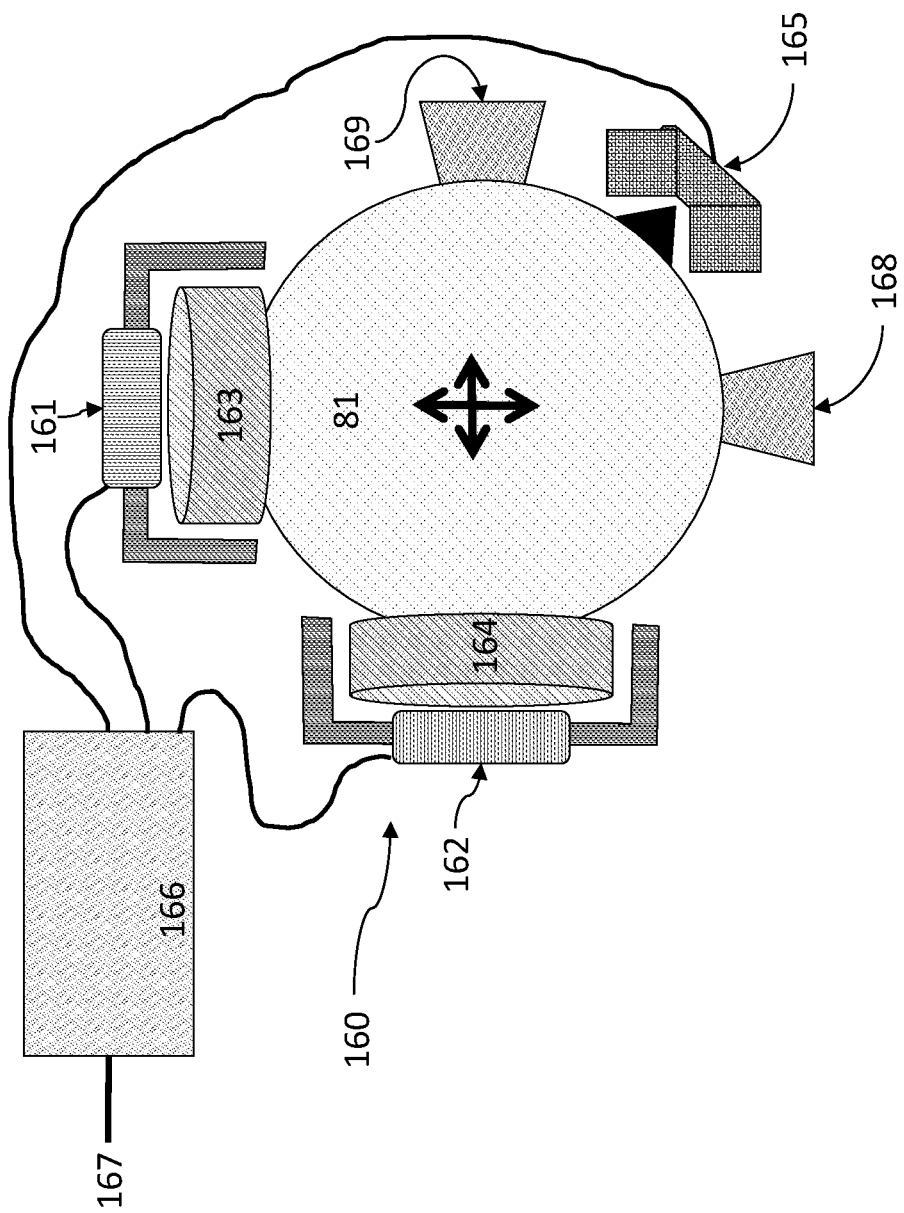
FIG. 16 illustrates a mechanical actuator arrangement for the optical element according to a preferred embodiment of the invention.

FIG. 16 illustrates a mechanical actuator arrangement 160 for the optical element according to a preferred embodiment of the invention. In this embodiment the optical element 81 is moved by an electromagnetic coil actuators (161, 162) composed of a moving magnet assembly for each of the horizontal and vertical directions (163, 164).

Those skilled in the art will note that it is possible to build a single moving magnet assembly to effect movement of the optical element 81 in both horizontal and vertical directions. In a preferred embodiment, a position feedback sensor 165 provides servo-feedback to the control board 166 such that the optical element offset and scan pattern is precisely controlled. Those skilled in the art will recognise that it is possible to do away with such a servo-feedback mechanism and run the actuators in open-loop mode, but that the inclusion of positional feedback will improve the reliability and repeatability of the scan pattern, as well as allow for more complex scan patterns (including but not limited to raster, spiral, triangular, hexagonal, random fill). In a preferred embodiment, the control board 166 output can include a time-base and/or position offset data 167 to allow for the correct synchronisation and display of sub-frames on the pixel array of the display elements (83, 84) corresponding to this offset. The optical element is held in place by mechanical retainers (168, 169) that allow for repetitive movement in both horizontal and vertical directions, and these may also serve to damp the movement of the optical element. In a preferred embodiment, the retainers are a material that allows the optical element 81 to be held in a rest position but allows for movement, for example, a rubber mount, metal leaf spring or linear bearing for each direction.

Figure 17:
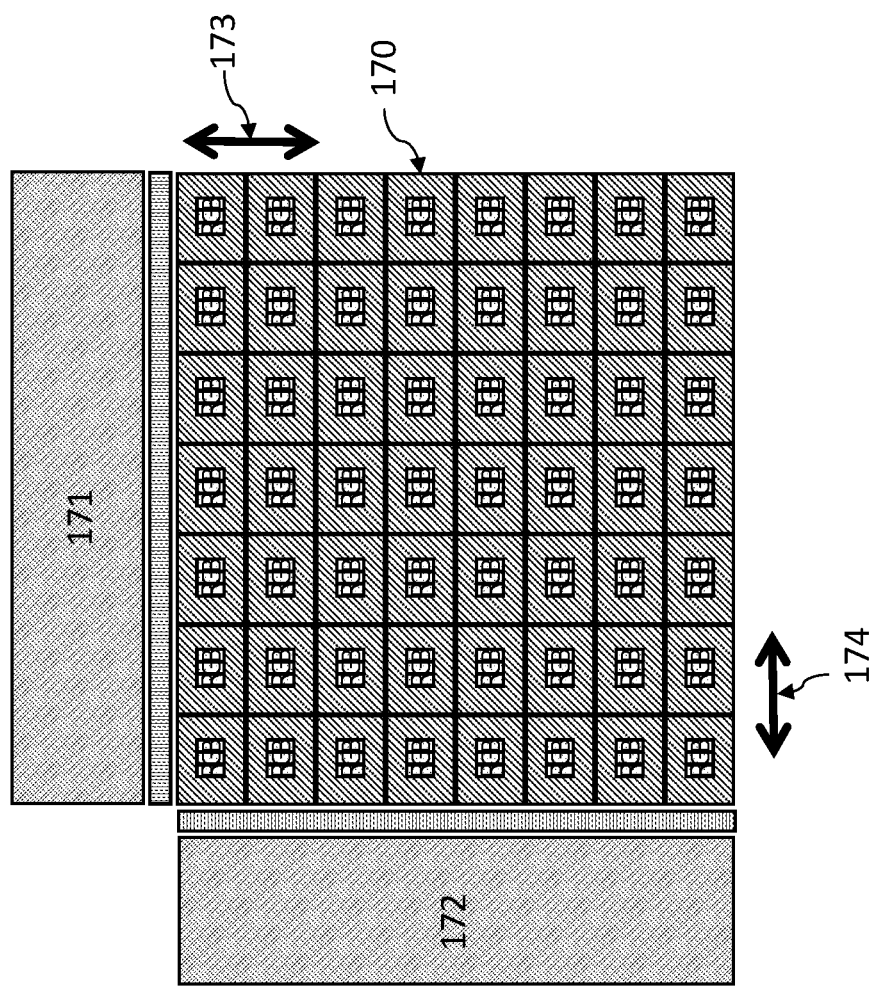
FIG. 17 illustrates a mechanical actuator arrangement for a display element according to an alternative embodiment of the invention.
Figure 20:
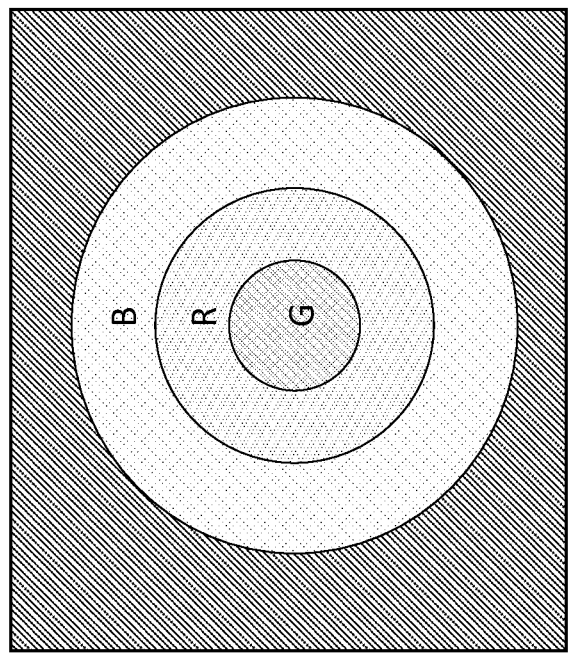
FIG. 20 illustrates a radial geometric pixel display region arrangement according to an embodiment of the invention.

FIG. 17 illustrates a mechanical actuator arrangement for a display element according to an alternative embodiment of the invention, where the display is actuated rather than the optical element. In an alternative embodiment, the entire physical display 170 is moved in horizontal and vertical directions relative to the optical element to effect the display pixel offset for each sub-frame position. In this embodiment, piezo-electric elements (171, 172) move the display in vertical 173 and horizontal 174 directions. It will be apparent to those skilled in the art that various other methods can be employed to move the physical display in horizontal and vertical directions, including but not limited to electrostatic actuators and electromagnetic actuators.

FIG. 18 illustrates an optical arrangement with a second motile waveguide array in front of the display element according to an alternative embodiment of the invention. In this alternative embodiment, the offset of the active region pixels can be obtained by moving an optical element or array in front of the display. In the example shown, a second motile waveguide array is used in front of the pixel apertures, and is moved by an actuator 182 in the horizontal and vertical directions (only the vertical direction is shown here for clarity) with the effect being to guide the light output from the waveguides 60 driven by the underlying physical pixels 62 that reduce the apparent size of the pixel active regions and allow for a transverse offset of the pixel aperture light output 184. A mask array 186 reduces the light bleeding into adjacent waveguide between pixels and couples the motile waveguide 188 to the static waveguide 60.

Figure 19:
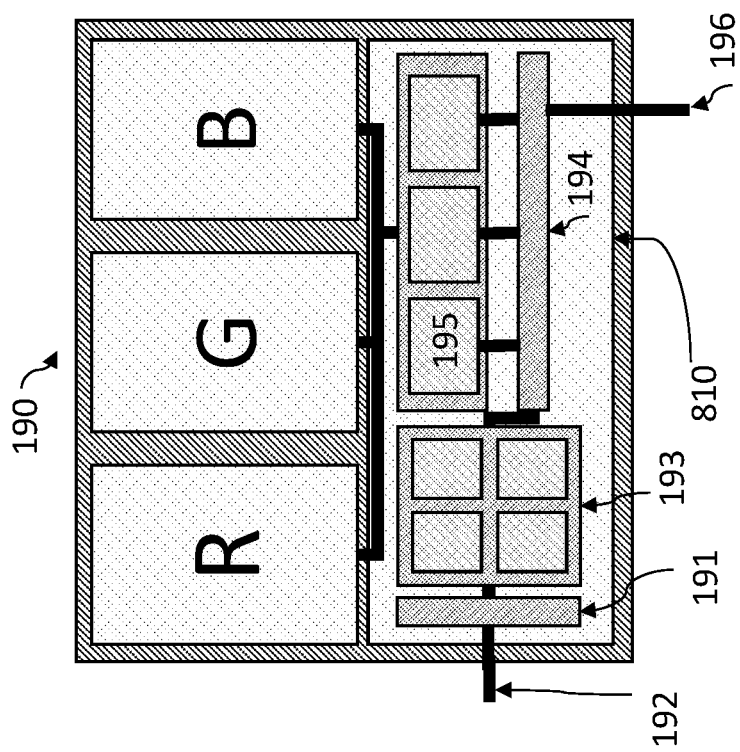
FIG. 19 illustrates a processor configured to synchronise activation and adapt the colour of said pixels in each said active region according to an embodiment of the invention.

FIG. 19 illustrates a processor 190 configured to synchronise activation and adapt the colour of said pixels in each said active region according to an embodiment of the invention. For example, in a preferred embodiment, since there is a larger non-active region around pixels is possible that for each individual red-green-blue sub-pixel cluster there is space to contain electronic elements which include a line decoder 191 and input 192, memory elements to hold pixel illumination values for each sub-frame, with four sub-frames memory elements shown in this particular example 193, a sub-frame pixel sequencer 194 and drivers 195 which allow the physical pixel illumination to be updated driven progressively in sequence corresponding to the sub-pixel offset against a time-base. In this way, a driver that is sending video data to the physical display element only sends the updated pixel values for each sub-frame position together with a time-base signal 196 to synchronise activation of the physical pixel corresponding to the offset position for each sub-frame. The advantages are that this decouples the display of an image using a fill pattern, from the refresh-rate of the physical display itself, simplifies the electronics and lowers the demands on the frame-buffer driving the display. As an example, for a display that utilises optical offset at 360 Hz to achieve 4× resolution using the methods described in this document (square fill-pattern with four offset sub-frame positions) and has an overall full-frame refresh rate of 90 Hz will have its pixels driven by the pixel driver electronics adjacent to each pixel at 360 Hz. The display driver electronics and demultiplexer driving the pixel array will allow for logical addressing of each sub-frame pixel, while the pixel driver electronics will sequence the display of sub-frame pixels against a time-base corresponding to the correct optical offset resulting in display the correct sub-frame pixels to a user for that offset.

In a preferred embodiment, the width of the active region is half the width of discontinuous or non-active (dark) regions around the pixel in the display region. As discussed above, pixel widths may vary which will increase or decrease the resolution of the display element according to the invention. Other colour system displays may also be used without departing from the spirit of the invention. For example, the display may be a monochromatic system where the pixel field does not incorporate any colour filter or alternating colour filter pattern, instead a controlled front or back light illuminates the pixels which modulate the intensity of the transmitted or reflected light across the active area of the display, the light being rapidly switched between red, green and blue sources, an RGB patterned system where active pixels are placed side-by-side (for example, Stripe, Bayer, Pentile, quincunx or diamond). It will be apparent to those skilled in the art that alternative RGB patterned systems are possible, such as where a radial geometric pixel is employed as shown in FIG. 19 or a CMY/CMYK patterned system where active pixel regions are stacked on top of each other and are illuminated by a white light source from the back or reflectively from the front. Those skilled in the art will note that it is possible to employ alternate pixel architectures such as PenTile, Bayer, stripe, and may also include other colour patterns such as red-green-blue-white or red-green-blue-yellow in the underlying pixel array.

While the invention has been illustrated and described in detail in the foregoing description, such illustration and description are to be considered illustrative or exemplary and non-restrictive; the invention is thus not limited to the disclosed embodiments. Features mentioned in connection with one embodiment described herein may also be advantageous as features of another embodiment described herein without explicitly showing these features. Variations to the disclosed embodiments can be understood and effected by those skilled in the art and practicing the claimed invention, from a study of the disclosure and the appended claims. In the claims, the word "comprising" does not exclude other elements or steps, and the indefinite article "a" or "an" does not exclude a plurality. The mere fact that certain measures are recited in mutually different dependent claims does not indicate that a combination of these measures cannot be used to advantage.

The invention claimed is:

1. A head mounted virtual reality display system comprising:
    a head mounted apparatus worn by a user;
    a display element having an array of display regions wherein said display region contains a smaller active region having an output aperture with at least one pixel of variable colour and luminosity and larger non-active region adjacent to the active region;
    means for scanning the apparent position of the active region onto the user's eye in both horizontal and/or vertical directions between a plurality of sub-frames within the display region in a pre-determined fill pattern, wherein said sub-frames cover an area including the original position of the larger non-active region and active region on the display region;
    a processor configured to synchronise activation and adapt the colour and luminosity of said at least one pixel in each said active region when the apparent position of the active region is scanned between sub-frames in order to correspond with the desired resolution of a multimedia image to be viewed by the user's eye;
    an optical element disposed between said display element and the eye of said user wherein means for scanning is configured to actuate the optical element to offset the apparent position of the active region in both horizontal and/or vertical directions relative to a user's eye;
    a waveguide adjacent to said display region between said display region and the eye of a user, wherein said waveguide is configured to decrease the apparent size of said active region and increase the uniformity of chrominance in the active region;
    wherein the ratio of the area of the smaller active region to the larger non-active region is a maximum of 1:4; and
    wherein the scanning means ensures that the apparent position of said active region is scanned through each sub-frame in said plurality of sub-frames at a rate of at least 60 Hz.

2. The head mounted virtual reality display system of claim 1, wherein the pre-determined fill pattern comprises at least one of the following group: raster, square, rectangular, circular, linear, spiral, ellipsoid, lyssajous, and/or random fill.

3. The head mounted virtual reality display system of claim 1 wherein said optical element is comprised of a combination of at least one or more of the group consisting of: single plan/convex lens; aspheric optic; rotating wedge; Fresnel lens; combination Fresnel/Aspheric lens; compound optical assembly; diffraction grating; zone plate or zone plate array; acousto-optical optic such as, but not limited to, KTLN (Potassium Lithium Tantalate Niobate) or TeO Tellurium Oxide with electronic or piezo-electric actuation; non-linear optic, prism, rectangular wedge or other plano/plano optic or displacement mirror.

4. A head mounted virtual reality display method comprising:
    providing a head mounted apparatus worn by a user;
    providing a display element having an array of display regions wherein said display region contains a smaller active region having an output aperture with at least one pixel of variable colour and luminosity and larger non-active region adjacent to the active region;
    providing means for scanning the apparent position of the active region onto the user's eye in both horizontal and/or vertical directions between a plurality of sub-frames within the display region in a pre-determined fill pattern, wherein said sub-frames cover an area including the original position of the larger non-active region and active region on the display region;
    providing a processor configured to synchronise activation and adapt the colour and luminosity of said at least one pixel in each said active region when the apparent position of the active region is scanned between sub-frames in order to correspond with the desired resolution of a multimedia image to be viewed by the user's eye;
    an optical element disposed between said display element and the eye of said user wherein means for scanning is configured to actuate the optical element to offset the apparent position of the active region in both horizontal and/or vertical directions relative to a user's eye;
    a waveguide adjacent to said display region between said display region and the eye of a user, wherein said waveguide is configured to decrease the apparent size of said active region and increase the uniformity of chrominance in the active region; and
    wherein the ratio of the area of the smaller active region to the larger non-active region is a maximum of 1:4; and
    wherein the scanning means ensures that the apparent position of said active region is scanned through each sub-frame in said plurality of sub-frames at a rate of at least 60 Hz.

5. The head mounted virtual reality display method of claim 4, wherein the pre-determined fill pattern comprises at least one of the following group: raster, square, rectangular, circular, linear, spiral, ellipsoid, lyssajous, and/or random fill.

6. The head mounted virtual reality display method of claim 4, wherein said optical element is comprised of a combination of at least one or more of the group consisting of: single plano/convex lens; aspheric optic; rotating wedge; Fresnel lens; combination Fresnel/Aspheric lens; compound optical assembly; diffraction grating; zone plate or zone plate array; acousto-optical optic such as, but not limited to, KTLN (Potassium Lithium Tantalate Niobate) or TeO Tellurium Oxide with electronic or piezo-electric actuation; non-linear optic, prism, rectangular wedge or other plano/plano optic or displacement mirror.

* * * * *